United States Patent [19]

Ooba et al.

[11] Patent Number: 5,528,761
[45] Date of Patent: Jun. 18, 1996

[54] MESSAGE PASSING APPARATUS FOR DETERMINING IF COUNTED ACKNOWLEDGEMENTS FROM A SET OF PROCESSORS ARE WITHIN A DEFINED RANGE

[75] Inventors: Nobuyuki Ooba; Kiyokuni Kawachiya, both of Kawasaki, Japan

[73] Assignee: International Business Machines Corporation, Armonk, N.Y.

[21] Appl. No.: 79,681

[22] Filed: Jun. 16, 1993

Related U.S. Application Data

[63] Continuation of Ser. No. 848,625, Mar. 9, 1992, abandoned.

[30] Foreign Application Priority Data

Mar. 29, 1991 [JP] Japan .................................... 3-089004

[51] Int. Cl.$^6$ ........................................................ G06F 13/42
[52] U.S. Cl. ........................ 395/200.14; 364/DIG. 1; 364/229.2; 364/240.9; 364/259.2
[58] Field of Search ................ 340/825.08, 825.54; 370/85.2, 85.8; 395/200, 275, 325, 725, 800

[56] References Cited

U.S. PATENT DOCUMENTS

| | | | |
|---|---|---|---|
| 3,810,110 | 5/1974 | Kotok et al. | 395/425 |
| 4,320,452 | 3/1982 | Kempf et al. | 395/325 |
| 4,430,639 | 2/1984 | Bennett | 340/310 A |
| 4,622,550 | 11/1986 | O'Connor et al. | 340/825.05 |
| 4,718,005 | 1/1988 | Feigenbaum et al. | 395/200 |
| 4,864,559 | 9/1989 | Perlman | 370/60 |
| 4,866,609 | 9/1989 | Calta et al. | 395/250 |
| 4,920,486 | 4/1990 | Nielsen | 395/325 |
| 4,941,143 | 6/1990 | Twitty et al. | 370/85.2 |
| 4,947,317 | 8/1990 | DiGiulio et al. | 395/325 |
| 4,998,245 | 3/1991 | Tanaka et al. | 340/825.08 |
| 5,068,785 | 11/1991 | Sugiyama | 395/325 |
| 5,170,473 | 12/1992 | Ishida | 395/325 |
| 5,367,693 | 11/1994 | Cassonnet et al. | 395/800 |

FOREIGN PATENT DOCUMENTS 1-251154  10/1989  Japan .

OTHER PUBLICATIONS

"High–Performance Multiprocessor Work Station TOP–1" Shimizu et al. Symposium of Parallel Processing JSPP 89, pp. 155–162.

JA Pupa 1–251154 IBM TDB, vol. 31, No. 6 P–438, Eng. "Facility for Providing Interrupts . . . ".

Primary Examiner—Thomas C. Lee
Assistant Examiner—Lance L. Barry
Attorney, Agent, or Firm—Lawrence D. Cutter; Floyd A. Gonzalez

[57] ABSTRACT

Upon requesting message passing in a multiprocessing system, a requesting processor sends a request to a set of the other processors in the multiprocessor system. The number of processors in a subset of the set of other processors is defined by an upper limit UNR and a lower limit LNR. A counter in the requesting processor counts acknowledgement signals from the other destination processors, and a comparator compares the count value of the counter with the lower and higher limit values. If the count value is not less than the lower limit value, the requesting processor performs message passing by sending a message to a number of destination processors up to the value of the upper limit.

6 Claims, 4 Drawing Sheets

MESSAGE PASSING APPARATUS FOR DETERMINING IF COUNTED ACKNOWLEDGEMENTS FROM A SET OF PROCESSORS ARE WITHIN A DEFINED RANGE

This is a continuation of application Ser. No. 07/848,625 filed on Mar. 9, 1992 now abandoned.

BACKGROUND OF THE INVENTION

1. Field of the Invention

This invention relates to multiprocessor computer systems having a plurality of processors interconnected through a shared bus, and more particularly, to a message-passing technique which enables the processors to perform asynchronous communication.

2. Description of the Related Art

Tightly coupled multiprocessor systems having a plurality of processor modules interconnected through a shared bus have been proposed and are being used in practice. In such tightly coupled multiprocessor systems, a plurality of processors proceed with their processing by reading from and writing to a shared memory. In order for the system to perform parallel processing, a mechanism for synchronization among processors is indispensable. The synchronization mechanism has a significant effect on the efficiency of the entire system.

A multiprocessor system of a shared memory type, in general, maintains synchronization among the processors by using a shared variable in the shared memory. Since events asynchronously generated cannot be efficiently communicated among the processors without the shared variable, a mechanism for permitting the processors to asynchronously interrupt one another is required.

A multiprocessor workstation proposed by the present inventors et al. ("High-performance Multiprocessor Work Station TOP-1", Shimizu, Ohba, Moriwaki, Nakada and Obara, Symposium of Parallel Processing JSPP '89, pp. 155–162) is equipped with message-passing hardware that permits processors to perform event-driven communications and request interruptions among themselves. This workstation has two kinds of message-passing schemes which differ depending upon whether the message is actually received by a receiving processor or destination processor. The messages from these two schemes are referred to herein as an "Everybody Message" (Message to all destinations) and an "Anybody Message" (Message to a desired destination).

In the "Everybody Message" scheme, message passing is successfully performed if all of the processors designated as destinations are ready for receipt of a message. Each processor in the disclosed system has a reception buffer. If a reception buffer is not vacant even in one of the destination processors such that the message is not received in all of the destination processors, the message passing scheme fails. The failure is detected by the transmitting processor. This method is effective for interruption of all processors and is desirable for coherency control of a TLB (Translation Look-aside Buffer) or the like.

In the "Anybody Message" scheme, message passing is successful if at least one of the destination processors is ready for the reception of a message. Message passing fails only when none of the processors is ready for reception. This method is effective for dispatching a given process to an arbitrary processor.

There are, however, other destination operations that have not been realized by these two kinds of message schemes. Consider, for example, a system in which eight processors send messages to one another. Neither of the above schemes allows one of the processors to send an interrupt to an arbitrary one of the other seven processors (although it has been possible to designate a particular processor as a target). Also, it has not been possible for a processor to send, for instance, a message to four or more of seven processors. It has also been impossible to make, for example, two arbitrary processors stop their current processes and assign to them new processes with hardware alone.

JA PUPA 1-251154 discloses a method for sending a message to processors of a designated class. IBM Technical Disclosure Bulletin, V. 31, No. 6, p 438 discloses a method of sending a message together with the IDs of processors who are to respond to the message.

SUMMARY OF THE INVENTION

An object of the invention is to provide a generalized asynchronous message-passing method for a multiprocessor system coupled through a shared bus. In particular, the greatest advantage of the invention lies in flexible, specific control of the designation of the destination processors. More specifically, the invention makes it possible to designate m arbitrary processors from all, i.e., n processors ($1=<m=<n$) and to pass a message to a set (p through q) of processors among the designated (m) processors ($1=<p=<q=<m=<n$). This fully includes the functions of the "Everybody Message" scheme and the "Anybody Message" scheme referred to herein, and enables a more powerful designation of the destination of a message.

In a multiprocessor system according to the invention, each processor comprises a means for generating a message-passing request signal, a means for generating acknowledge signals to message-passing request signals from other processors, a means for counting acknowledge signals issued from other processors in response to its own message-passing request signal, a means for defining the range of the number of message-passing destination processors, and a means responsive to the count value of the acknowledge signals for determining whether a message can be sent to such a number of processors as to be included within the range.

In this arrangement, several types of message passing are possible. The processor numbers (i.e. 1,2,3,4, ... 8) are used herein as the ID of the respective processors. Suppose a system includes eight (n) processors, (processor 1 through processor 8), which are coupled through a shared bus. One processor sends a message designating three pieces of information: first, an ID or IDs of one or more message-passing destination processors (m); second, the lower limit number (p) of receiving processors; and third, the upper limit number (q) of the receiving processors. The lower limit number (p) of the receiving processors indicates "how many processors, at a minimum, must be ready for receiving a message", and the upper limit number (q) of the receiving processors indicates "how many, at a maximum, of the processors are selected as destinations from the processors which are ready for receiving the message".

For example, when the processor 1 is requested to send a message to all of the seven processors, processors 2 through 8, (this corresponds to the Everybody Message), the destination IDs are 2, 3, 4, and 8. The upper (p) and lower (q) limit numbers are both 7. Message passing is successful only when all of the seven processors 2 through 8 are ready for reception and a message is sent to each of these seven processors.

When the processor 1 is requested to send a message to one or more of the seven processors 2 through 8 (this corresponds to an Anybody Message), the lower limit (p) number is 1 and the upper limit (q) number is 7.

When the processor 1 is requested to send a message to only one of five of the processors, processor 2 through 6, the destination IDs are 2, 3, . . . , and 6, and the lower (p) and upper (q) limit numbers are both 1.

When the processor 1 is requested to send a message to two or more of four of the processors, processors 5 through 8, the destination IDs are 5, 6, 7, and 8, and the lower limit (p) number is 2, and the upper limit (q) number is 4.

When the processor 1 is requested to send a message to three to five of the seven processors, processors 2 through 8, the destination IDs are 2, 3, 4, . . . , and 8, and the lower limit number (p) is 3, and the upper limit number (q) is 5.

As shown in the foregoing examples, the invention enables very flexible, specific designation of destination processors for message passing.

DESCRIPTION OF A PREFERRED EMBODIMENT OF THE INVENTION

Figure 1:
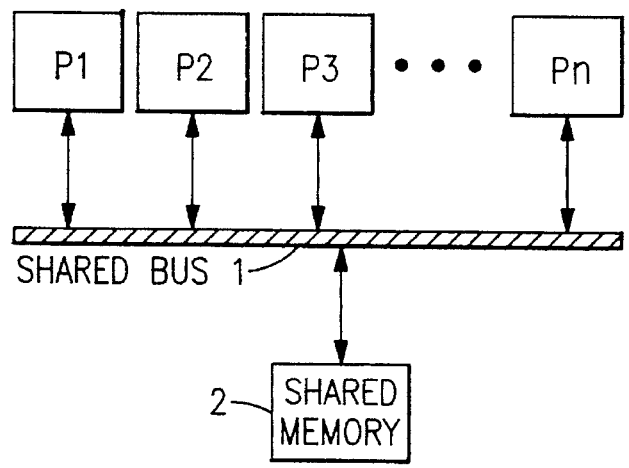
FIG. 1 is a block diagram of a multiprocessor system embodying the present invention.

An embodiment of the invention is described below with reference to the drawing.

FIG. 1 shows an embodiment of the invention. A plurality of processors P1, P2 . . . Pn are connected to shared memory 2 via a shared bus 1. The shared bus 1 includes a message-exchange bus to be discussed in connection with FIG. 2. The processors exchange messages with each other through the message-exchange bus 1.

Figure 2:
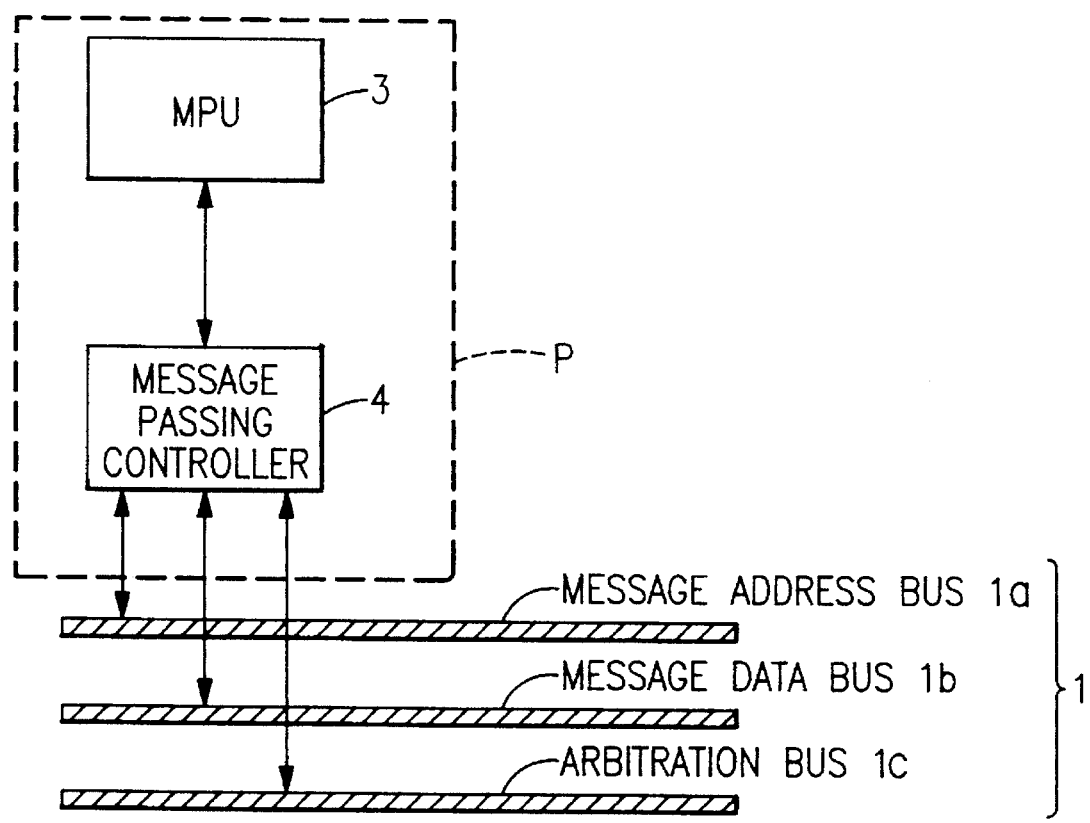
FIG. 2 is a schematic diagram of a processor in the system of FIG. 1 showing the message passing controller and bus structure according to the present invention.

FIG. 2 shows an arrangement of message-passing hardware, a message bus (address bus and data bus), and an arbitration bus according to the invention. In FIG. 2, a processor P comprises an MPU (microprocessing unit) 3 and a message-passing controller 4. Although the processor P further has a memory-access controller and other elements, such elements do not have direct relevancy to the present invention and are not shown in FIG. 2. The shared bus 1 includes a message address bus 1a, a message data bus 1b, and an arbitration bus 1c. The message-passing controller 4 is coupled directly to the MPU 3 for receiving instructions. It will be understood that MPU 3 gives instructions for message passing to a register (to be discussed in connection with FIGS. 3 and 4) by executing I/O read/write operations.

The message-passing controller 4 exchanges messages with other message-passing controllers 4 (which are implemented in the same way), of the other processors via the three buses, i.e., the message-address bus 1a, the message-data bus 1b, and the arbitration bus 1c.

The message-address bus 1a is a control bus for designating a destination of a message and includes as many signal lines as there are processors. If the total number of the processors is n, the message address bus includes n lines, ADS1 through ADSn, corresponding to the respective processors.

The message-data bus 1b is for sending a message itself. If x bits of a message are sent at one time, the bus 1b includes x signal lines.

The arbitration bus 1c is used for the arbitration of bus acquisition when message-transmission requests are issued simultaneously from a plurality of message-passing controllers 4, and is also used for responses indicating whether or not a processor is ready for reception when the responding processor is a message-passing destination. The arbitration bus 1c includes as many lines ARB1 through ARBn, as there are processors. Various kinds of arbitration methods may be used such as, for example, the method used in the publication "High-Performance Multiprocessor Work Station TOP-1" referred to above.

Figure 3:
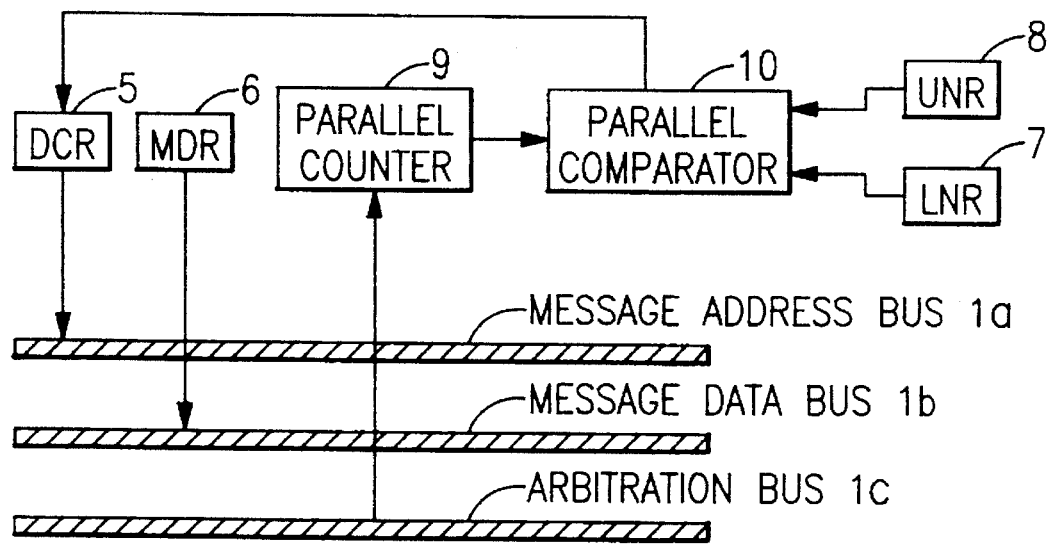
FIG. 3 is a block diagram of the message transmission function of the message passing controller shown in FIG. 2.
Figure 4:
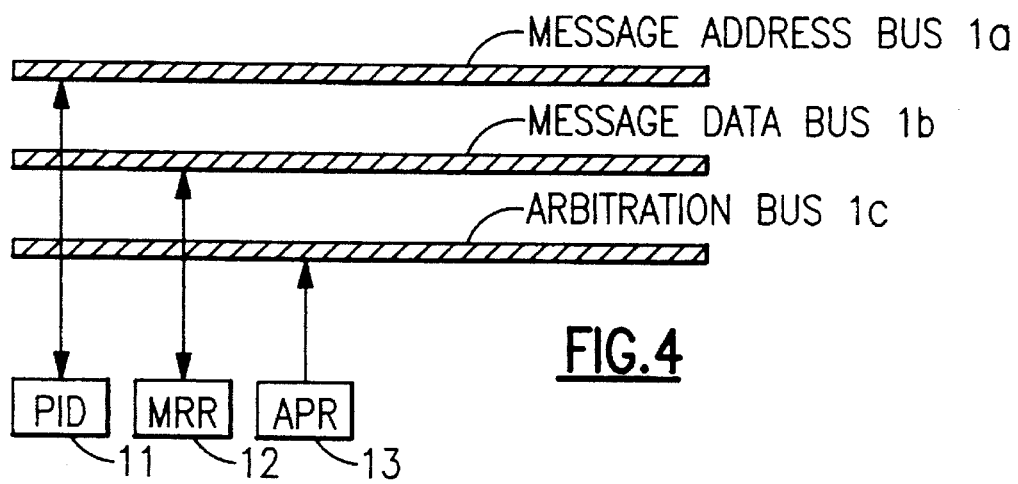
FIG. 4 is a block diagram of the message receiving function of the message passing controller shown in FIG. 2.

Next refer to FIGS. 3 and 4 for details of the message-passing controller 4. FIG. 3 shows a part of the message-passing controller 4 for the transmission of a message, whereas FIG. 4 shows a part of the message-passing controller 4 for the reception of a message.

In FIG. 3, elements operative upon transmission of a message are: a destination-control register (DCR) 5, a message-data register (MDR) 6, a lower-limit-receiving number register (LNR) 7, an upper-limit-receiving register (UNR) 8, a parallel counter 9, and a parallel comparator 10.

The DCR 5 is a register that designates the destination of a message. Suppose the system includes eight processors; then the DCR consists of eight bits. Each bit corresponds to a respective processor, and processors whose bits are 1 are selected to be destinations. For example, a message is desired to be sent from the processor 1 to the processors 2, 5, 6, 7, the DCR bits corresponding to the destination processors are set to 1 as follows:

| Processor | 1 | 2 | 3 | 4 | 5 | 6 | 7 | 8 |
|---|---|---|---|---|---|---|---|---|
| DCR bit | 0 | 1 | 0 | 0 | 1 | 1 | 1 | 0 |

In other words, processors for which the bits of the DCR 5 are set to 1 are candidates for receiving a message. Whether the message is actually sent to them depends on the content of the UNR 8 and the LNR 7, to be explained. Each bit of the DCR 5 is connected directly to the message-address bus 1a. The signal lines of the message-address bus 1a are statically assigned to the respective processors upon initialization of the system. For example, signal line ADS 1 is assigned to processor 1, signal line ADS 2 is assigned to processor 2, etc.

The MDR 6 is used for storing the content of a message to be sent. When the message passing succeeds, the content of the MDR 6 is transmitted over the message bus 1b to one or more destination processors.

The LNR 7 is a register for designating how many processors must be ready for receiving a message for the message passing to be successful. If, to be successful, message passing is to go to one or more destination processors capable of message reception, the LNR 7 is set to 1. If, to be successful, message passing is to go to four or more processors ready for reception, the LNR is set at 4. It will be understood that LNR 7 contains the "p" value previously described.

The UNR 8 is a register for containing the maximum number of processors to which the message is sent, when message passing is possible. By combining the number in UNR 8 with the number in LNR 7, the specific designation of the destinations is possible. For example, when a message is requested to be sent to only one processor, both the LNR 7 and the UNR 8 should be set at 1. It will be understood that UNR 8 contains the "q" value previously described.

The parallel counter 9 counts how many processors send back an affirmative acknowledge (ACK). As previously described, the arbitration bus 1c includes n signal lines, each corresponding to a respective processor. When a message command is sent, ACK or ACKs return from one or more processors among the destination processors Which are ready for receiving a message. The parallel counter 9 counts these ACKs.

The parallel comparator 10 compares the contents of the parallel counter 9 (the count indicating how many processors among the destination processors send back ACKs) with the contents of the LNR 7. When the number of ACKs sent back is not less than the value set in the LNR 7, a number of processors up to the value in UNR 8 are selected. In other words, processors will not be selected as destinations unless the number of ACKs is equal to or greater than the number in LNR 7. Thus, if the number of ACKs is equal to or greater than the number in LNR 7, then a number of processors up to the number in UNR 8 will be selected. The processors are selected in priority order, from higher to lower. The bits in the DCR 5 corresponding to the selected processors are set to 1.

FIG. 4 shows other elements of the message passing controller 4, operative upon reception. These other elements are a processor ID register (PID) 11, a message-reception register (MRR) 12, and an arbitration-priority register (APR) 13.

The PID 11 is a register for holding the identification (ID) of the processor for which the message-passing controller 4 serves. The ID in PID 11 is compared with destination addresses issued on the message address bus 1a.

The MRR 12 is a buffer for storing the message data.

The APR 13 is a register for holding a priority for arbitration. Every time bus arbitration is executed, the priority increases by one, and returns to zero upon overflow. The system is designed such that, at any time, each processor has a different priority from the other processors.

Next refer to FIGS. 5 and 6a–6c for the operation of the embodiment.

Figure 5:
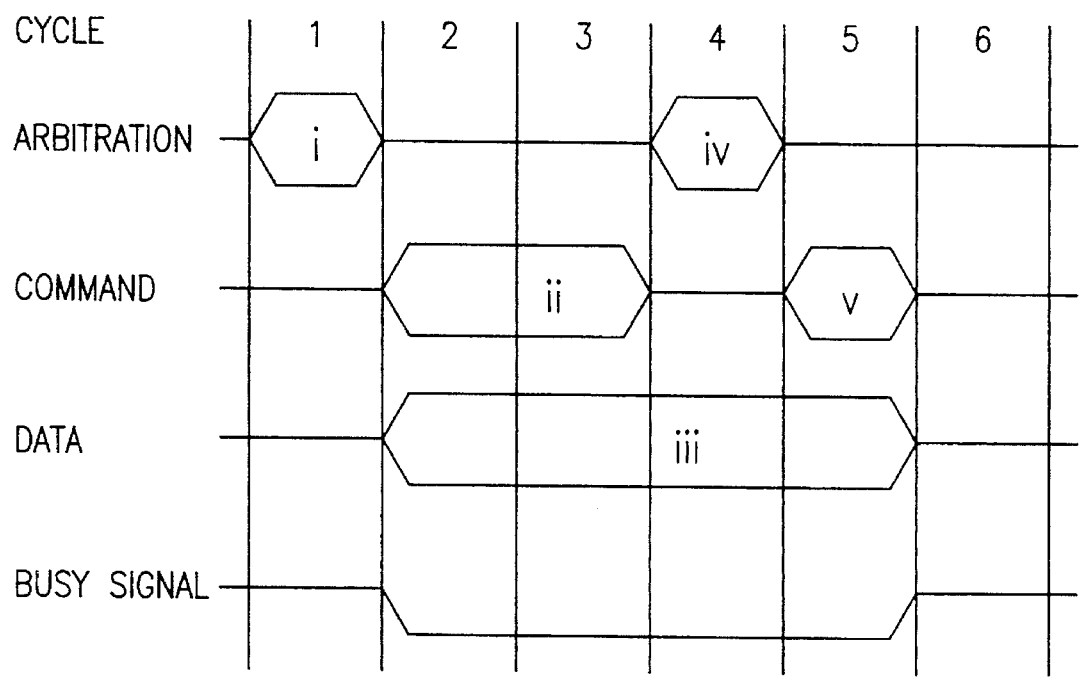
FIG. 5 is a timing chart showing message passing according to the present invention.
Figure 6A:
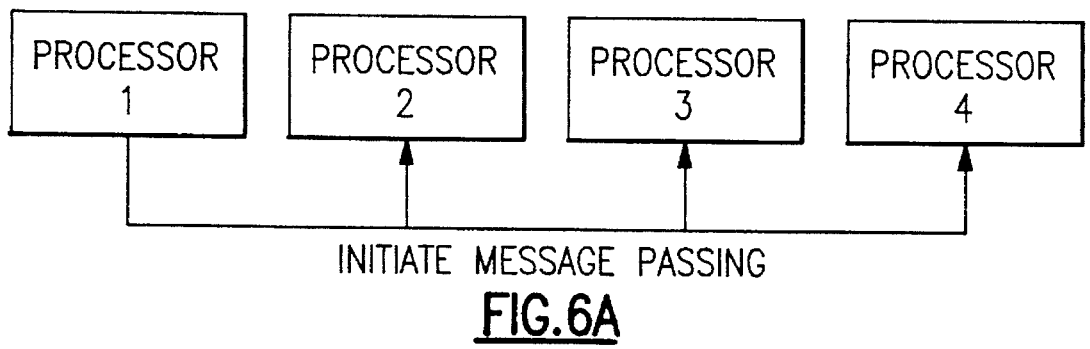
FIGS. 6a–6c are block diagrams of a multiprocessor system according to the present invention showing an example of an information exchange among processors.
Figure 6B:
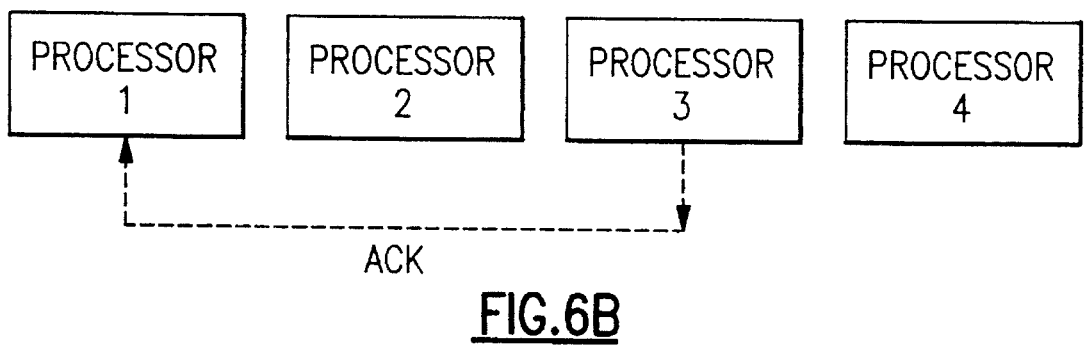
Figure 6C:
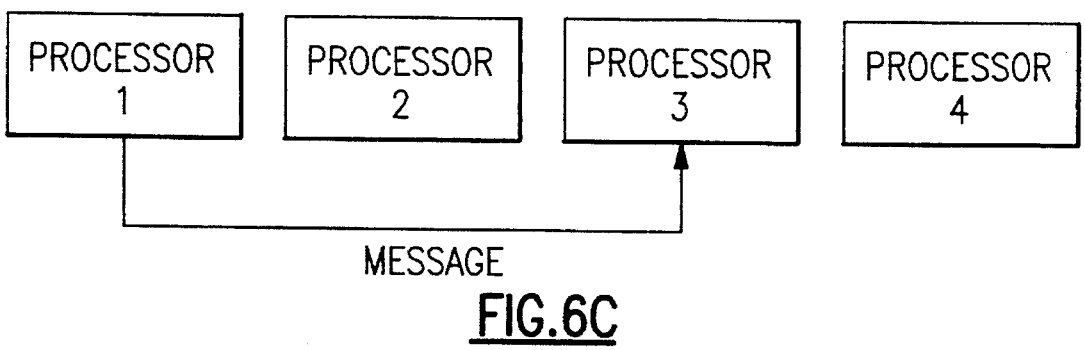

FIG. 5 shows a time chart of message passing, and FIGS. 6a–6c show an example of information exchanges among processors.

A plurality of processors may simultaneously request a bus. Bus arbitration is first executed at a timing i in a cycle 1. This is a normal arbitration for acquiring the bus. The processor that has won the arbitration can then start its message-passing processing. During the following message-passing operation, the message-passing controller 4 of the winning processor keeps a busy signal active so that new bus arbitration does not occur.

The processor that won the bus then issues a message command (timing ii) and sends message data (timing iii) on the message-address bus and the message-data bus, respectively, in a cycle 2. The message command designates one or more destination processors. In FIG. 6a, the processor 1 sends a message command to the processors 2, 3, and 4. Each processor thus designated as a destination, checks its own condition for receiving message in a cycle 3, and, only when it is ready for reception, it sends back an ACK to the arbitration bus in cycle 4 (timing iv).

In the example shown in FIG. 6b, processor 3 alone is ready for receiving a message and sends back an ACK. In cycle 5, the message passing controller of the sending processor (processor 1) observes the ACK from processor 3 and thereby determines which of the destination processors are ready for receiving the message. When more ACKs have been sent back than the minimum receiving number needed for a successful message passing operation, processor 1 again sends the command to the maximum number of processors (cycle 5, timing v), and sends the message. In the present example, processor 1 sends the message data to processor 3, as shown in FIG. 6c. Thus the processor designated as a destination by the command finally receives the message.

As described in the above, the invention performs message passing by designating a range for the number of destination processors, and thus enables flexible, specific message passing. Its effects are discussed below with reference to some examples.

Suppose that some processors are permitted to receive a process and that a certain process is desired to be assigned to one of them. An interruption request is sent to that one processor to make that one processor switch from its current process to the desired process.

When the conventional message-passing method (Anybody Message) is used, a message is sent to all processors that permit the reception of the process. The plurality of processors receiving the message is interrupted and each must exclusively acquire the process by using a semaphore or the like in the shared memory. The one processor that wins the semaphore must receive and initiate the assigned process. The remaining processors then restore their conditions as before the interruption.

In contrast, when the message-passing method according to the present invention is used, a message is sent to all destination processors which permit the reception of the desired process. Then, only one of the processors is automatically selected, that selected processor alone is interrupted, and processing of the desired process is initiated. Specifically, the use of the method according to the invention gives two advantages. The first advantage is that no interruption request is sent to processors that need not be interrupted. Interruption processing seriously affects a processor. For example, a typical 32-bit microprocessor, 80386, (produced by Intel, U.S.A.) takes only several to tens of cycles for addition, subtraction, multiplication, or subtraction, but requires 200 or more cycles for an interruption. The other advantage is that a quasi-software exclusive control, such as a semaphore, is not required. If such an exclusive control using a shared variable causes memory access, the memory access in turn causes access to the shared bus and increases traffic on the shared bus. Unnecessary access to the shared bus adversely affects the performance of the system.

Suppose that processes A, B, and C are waiting for processors to become available and that execution of these processes A, B, and C require two processors, four processors, and five processors respectively. In this case, the receiving number of processors (m) is 5, the minimum number (p) is 2 and the maximum number (q) is 5. Using the message-passing mechanism of the present invention, the process A, B, or C can be selectively initiated depending on the number of the processors that receive the message, i.e., that have been acquired for execution of processes. More specifically, when two or three processors receive the message, process A may be initiated, when four processors receive the message, process B may be initiated, and when five processors receive the message, process C may be initiated.

While the invention has been described with reference to a preferred embodiment thereof, it is understood that the invention is not restricted by the embodiment, but only by the claims which follow. It is also understood that various changes in embodiments of the invention can be made by those skilled in the art without departing from the spirit or scope of the invention.

What is claimed is:

1. In a multiprocessor system having a plurality of processors connected by a bus, a message-passing apparatus for passing messages from one of said plurality of processors to a set of the other processors in a message-passing operation, said message apparatus comprising:

set-defining means in said one processor for defining a set of other processors in said plurality of processors;

request sending means in said one processor connected to said set-defining means for sending a message-passing request to said set of the other processors in said plurality of processors via said bus;

acknowledge-sending means in each of said other processors, each of said acknowledge-sending means being connected to said bus for sending an acknowledgement via said bus to said one processor in response to said message-passing request from said request-sending means, said acknowledgement indicating that the respective processor of the acknowledge-sending means has received said message-passing request and is ready to receive a message;

acknowledge-receiving means in said one processor and connected to said bus in said other processors for receiving acknowledgements from the acknowledge-sending means in said other processors;

counting means connected to said acknowledge-receiving means for counting acknowledgements sent to said one processor by said other processors;

range defining means in said one processor for defining a subset within said set of other processors to which messages will be sent in a message-passing operation, said range-defining means having a lower limit register for storing a first value, which is greater than or equal to one but less than or equal to the size of the subset, for indicating the number of acknowledgements below which said message-passing operation will not be successful, and a higher-limit register for storing a second value which is equal to or greater than the first value but less than or equal to the size of the subset, said second value for indicating the maximum number of processors to which messages will be sent in said successful message-passing operation; and comparing means connected between said counting means and said range-defining means for comparing count in said counting means with the numbers in said lower-limit register and said higher-limit register for determining if the count of other processors sending acknowledgements is within said set, thereby allowing for a successful message-passing operation.

2. The message-passing apparatus of claim 1 wherein each processor includes said request-sending means, said counting means, said range-defining means and said comparing means;

said bus comprises an arbitration bus; and each of the processors in said plurality of processors further comprises priority means connected to said arbitration bus for placing a priority on said arbitration bus such that the processors, which send message-passing requests from their request-sending means, are selected by said priority means in priority order.

3. The message-passing apparatus of claim 2 wherein each request-sending means includes identification-sending means for sending, via said bus, identifications (IDs) of the processors from which said set is to be selected, and each of said processors includes a processor-identification register (PID) for holding its ID such that the ID in each PID may be matched with the IDs sent via said bus to determine if that processor is one from which said set is to be selected.

4. A message-passing apparatus comprising:

a plurality of n processors, one of said processors being a message-sending processor;

a connecting bus connected to each of the processors in said plurality of processors;

set-defining means in said message-sending processor for defining a set of m processors within said n processors;

range-defining means in said message-sending processor and connected to said connecting bus, said range-defining means for defining a range of processors which must be ready to receive a message from said sending processor in order to have a successful message-passing operation, said range having a lower number p and a higher number of q, where said values p and q are both greater than or equal to one, and are both less than or equal to the value of the range;

request-sending means in said sending processor connected to said set-defining means and to said bus, said request-sending means for sending a request via said bus to said m processors;

acknowledge means in each of the processors connected to said bus and being responsive to said request, each acknowledge means for sending an acknowledgement (ACK) via said bus to said sending processor it its respective processor is ready to receive a message when said request is received;

acknowledge-receiving means in said sending processor and connected to said connecting bus, said acknowledge-receiving means for receiving said ACKs from said acknowledge means via said connecting bus;

counting means in said sending processor connected to said acknowledge-receiving means, said counting means for counting said ACKs received by said acknowledge-receiving means;

comparing means connected to said counting means and said range-defining means for comparing the number of ACKs counted by said counting means and determining when the number of ACKs is not less than p; and message-sending means in said sending processor connected to said comparing means and said connecting bus, said message-sending means for sending a message via said bus to a number of processors up to the value of q when the number of ACKs received by said sending means is not less than p, as determined by said comparing means.

5. The message-passing apparatus of claim 4 wherein said set-defining means includes a storage means having n storage locations, one storage location for each of the processors, each storage location being in an active state only when its respective processor is to receive a message from said message-sending means.

6. In a first processor for use with a system having multiple processors connected by a bus, a message-passing apparatus comprising:

set-defining means in said first processor for defining a set of other processors in said system;

request-sending means in said first processor and connected to said set-defining means and said bus, said request-sending means for sending message-passing-request signals over said bus to said set of other processors in said system;

ACK-receiving means in said first processor and connected to said bus for receiving acknowledgements (ACKs) sent from said set of other processors in said system in response to a message-passing-request signal from said request-sending means;

counting means in said first processor and connected to said ACK-receiving means for counting the ACKs received by said ACK receiving means;

range-defining means in said first processor for storing a range of ACKs which must be counted by said counting means before a message-passing operation will be successful, said range having a p number and a q number, said q number being equal to or greater than said p number;

comparing means in said first processor and connected between said counting means and said range-defining means, said comparing means for comparing the count of said counting means with the p and q numbers of said range-defining means; and selecting means in said first processor and connected to said comparing means for selecting processors in the set of processors in the system to which messages are to be sent, the number of selected processors being at least equal to p and not more than q, as determined by said comparing means, where p and q are both greater than or equal to one, but less than or equal to the size of the subset.

* * * * *